United States Patent
Woo et al.

(10) Patent No.: US 9,379,380 B2
(45) Date of Patent: Jun. 28, 2016

(54) ANODE ACTIVE MATERIAL FOR LITHIUM SECONDARY BATTERIES AND METHOD FOR MANUFACTURING SAME

(71) Applicant: LG Chem, Ltd., Seoul (KR)

(72) Inventors: Sang-Wook Woo, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/267,189

(22) Filed: May 1, 2014

(65) Prior Publication Data

US 2014/0242460 A1 Aug. 28, 2014

Related U.S. Application Data

(63) Continuation of application No. PCT/KR2012/010582, filed on Dec. 6, 2012.

(30) Foreign Application Priority Data

Dec. 6, 2011 (KR) .................. 10-2011-0129605
Dec. 6, 2012 (KR) .................. 10-2012-0141426

(51) Int. Cl.

| H01M 4/58 | (2010.01) |
|---|---|
| H01M 4/13 | (2010.01) |
| H01M 6/00 | (2006.01) |
| H01M 4/36 | (2006.01) |
| H01M 4/38 | (2006.01) |
| H01M 4/583 | (2010.01) |

(Continued)

(52) U.S. Cl.
CPC ............. *H01M 4/366* (2013.01); *B22F 1/0085* (2013.01); *B22F 1/02* (2013.01); *C23C 18/1635* (2013.01); *C23C 18/1696* (2013.01); *C23C 18/30* (2013.01); *C23C 18/36* (2013.01); *H01M 4/0452* (2013.01); *H01M 4/0471* (2013.01); *H01M 4/13* (2013.01); *H01M 4/139* (2013.01); *H01M 4/386* (2013.01); *H01M 4/583* (2013.01); *H01M 4/587* (2013.01); *H01M 4/62* (2013.01); *B22F 2999/00* (2013.01); *H01M 10/052* (2013.01); *Y02E 60/122* (2013.01)

(58) Field of Classification Search
CPC combination set(s) only.
See application file for complete search history.

(56) References Cited

U.S. PATENT DOCUMENTS 6,245,463 B1 * 6/2001 Matsuo et al. ................ 429/245
6,485,831 B1 * 11/2002 Fukushima et al. .......... 428/403

(Continued)

FOREIGN PATENT DOCUMENTS

| KR | 102009109225 A | * 10/2009 |
|---|---|---|
| KR | 20100132839 A | 12/2010 |

(Continued)

OTHER PUBLICATIONS

International Search Report and Written Opinion for Application No. PCT/KR2012/010582 dated Feb. 22, 2013.

(Continued)

*Primary Examiner* — Daniel Gatewood
(74) *Attorney, Agent, or Firm* — Lerner, David, Littenberg, Krumholz & Mentlik, LLP (57) ABSTRACT

Disclosed are an anode active material for lithium secondary batteries and a method for manufacturing same, the anode active material comprising: a core part including a carbon-silicon complex and having a cavity therein; and a coated layer which is formed on the surface of the core part and includes a phosphor-based alloy.

4 Claims, 6 Drawing Sheets

(51) Int. Cl.

| | | |
|---|---|---|
| *H01M 4/139* | (2010.01) | |
| *C23C 18/16* | (2006.01) | |
| *C23C 18/30* | (2006.01) | |
| *C23C 18/36* | (2006.01) | |
| *B22F 1/00* | (2006.01) | |
| *B22F 1/02* | (2006.01) | |
| *H01M 4/04* | (2006.01) | |
| *H01M 4/587* | (2010.01) | |
| *H01M 4/62* | (2006.01) | |
| *H01M 10/052* | (2010.01) | |

(56) References Cited

U.S. PATENT DOCUMENTS

| | | | |
|---|---|---|---|
| 2006/0216606 A1* | 9/2006 | Kim et al. ................... 429/232 | |
| 2008/0193856 A1 | 8/2008 | Mizutani et al. | |
| 2009/0029256 A1 | 1/2009 | Mah et al. | |
| 2011/0097629 A1 | 4/2011 | Yew et al. | |
| 2011/0192281 A1* | 8/2011 | Hosseini ............ B01D 67/0006 96/10 | |
| 2011/0256452 A1 | 10/2011 | Cho et al. | |

FOREIGN PATENT DOCUMENTS

| | | |
|---|---|---|
| KR | 20110046076 A | 5/2011 |
| KR | 20110116585 A | 10/2011 |

OTHER PUBLICATIONS

A.M. Wilson et al., Pyrolysed silicon-containing polymers as high capacity anodes for lithium-ion batteries, Oct. 1, 1997, Journal of Power Sources,k Elsevier SA, CH, vol. 68, No. 2, pp. 195-200.

* cited by examiner

ANODE ACTIVE MATERIAL FOR LITHIUM SECONDARY BATTERIES AND METHOD FOR MANUFACTURING SAME

CROSS-REFERENCE TO RELATED APPLICATION

The present application is a continuation of International Application No. PCT/KR2012/010582 filed on Dec. 06, 2012, which claims priority under 35 USC 119(a) to Korean Patent Application No. 10-2011-0129605 filed in the Republic of Korea on Dec. 6, 2011 and Korean Patent Application No. 10-2012-0141426 filed in the Republic of Korea on Dec. 6, 2012, the disclosures of which are incorporated herein by reference.

TECHNICAL FIELD

The present disclosure relates to an anode active material for a secondary battery, and more particularly, to an anode active material for a secondary battery comprising a phosphorus-based alloy coating layer on a surface of a carbon-silicon composite.

BACKGROUND ART

Different types of electrolytes are widely being used in electrochemical devices, such as lithium secondary batteries, electrolytic condensers, electric double layer capacitors, electrochromic display devices, as well as dye-sensitized solar cells of which various studies are being conducted for future commercialization, and so the importance of electrolytes is growing day by day.

Particularly, lithium secondary batteries are attracting the most attention due to their high energy density and long cycle life. Generally, a lithium secondary battery includes an anode made from a carbon material or a lithium metal alloy, a cathode made from lithium metal oxide, and an electrolyte in which a lithium salt is dissolved in an organic solution.

Initially, lithium metal was used as an anode active material comprising an anode of a lithium secondary battery. However, because lithium has drawbacks of low reversibility and safety, currently, carbon material is mainly used as an anode active material of a lithium secondary battery. A carbon material has a lower capacity than a lithium metal, but has merits of a small volume change, excellent reversibility, and a low cost advantage.

However, as the use of lithium secondary batteries are expanding, the demand for high-capacity lithium secondary batteries is also increasing. Accordingly, there is a demand for high capacity anode active materials that may substitute the carbon material having low capacity. To meet the necessity, attempts have been made to use, as an anode active material, a metal that exhibits a higher charge/discharge capacity than a carbon material and allows electrochemical alloying with lithium, for example, Si, Sn, and the like.

However, this metal-based anode active material has a very great volume change during charging and discharging, which may cause cracks to an active material layer. Accordingly, secondary batteries using this metal based anode active material may suddenly deteriorate in capacity and reduce in cycle life over repeated cycles of charging/discharging, and thus are not suitable for commercial use.

To solve these problems, studies have been conducted to use an alloy of Si and/or Sn and another metal as an anode active material. However, the use of such an alloy contributes to the improvement of cycle life characteristics and prevention of volume expansion to some extent when compared with the use of metal alone as an anode active material, but the volume expansion generated during alloying with lithium still causes stress, thereby leading to an insufficient commercial use of secondary batteries.

DISCLOSURE

Technical Problem

The present disclosure is designed to provide an anode active material for a lithium secondary battery using Si that may relieve stress caused by volume expansion generated during alloying with lithium, and a method of manufacturing the same.

Technical Solution

To achieve the above object, there is provided an anode active material for a lithium secondary battery, comprising a core including a carbon-silicon composite and having a cavity formed inside, and a coating layer formed on a surface of the core and including a phosphorus (P)-based alloy.

The coating layer may be formed of a plurality of domains including a phosphorus-based alloy. The phosphorus-based alloy may use an alloy of phosphorous and a metal selected from the group consisting of Al, Ti, Cr, Mn, Fe, Co, Ni, Cu, Zn, Ga, Ge, As, Pd, Ag, In, Sn, and W.

Also, the carbon-silicon composite may further include oxygen.

A density of the coating layer is preferably in a range of 1.2 to 5.8 g cm $^{-3}$, and a thickness of the coating layer is preferably equal to or less than 0.1 μm.

A specific surface area of the core is preferably equal to or less than 50 m$^2$/g, and an average particle diameter of the core is preferably in a range of 0.5 to 100 μm.

Also, the anode active material of the present disclosure may be used in an anode of a lithium secondary battery comprising a current collector, and an anode active material layer formed on at least one surface of the current collector and including an anode active material. Also, using this anode, a lithium secondary battery comprising a cathode, an anode, and a separator interposed between the cathode and the anode may be provided.

A method of manufacturing the anode active material for the lithium secondary battery according to an embodiment of the present disclosure comprises treating a silicon polymer particle with a metal chloride solution to prepare the silicon polymer particle with a metal catalyst supported on a surface, dispersing the silicon polymer particle with the metal catalyst supported on the surface in a plating bath filled with a plating solution containing a metal ion for a phosphorous-based alloy and phosphoric acid, heating the bath to form a phosphorous (P)-based alloy surface-coated silicon polymer particle, and carbonizing the phosphorous (P)-based alloy surface-coated silicon polymer particle by heat treatment in a reducing atmosphere.

The silicon polymer particle is not limited to a specific type, but may use a particle of silicons resin, for example, polysiloxane, polysilane, and polycarbosilane.

Also, the metal chloride solution may be one that metal chloride selected from PdC12, SnC12, and CuC12 is dissolved in an aqueous solution of nitrohydrochloric acid or hydrochloric acid, or in a polar organic solvent of dimethylformamide (DMF), hexamethylphosphoramide (HMPA), dimethylacetamide (DMA) or dimethylsulfoxide (DMSO).

Also, the metal ion for the phosphorous-based alloy may use $Ni^{2+}$, $Cu^{2+}$, $Ti^{4+}$, $Al^{3+}$, $Cr^{2+}$, $Cr^{3+}$, $Cr^{6+}$, $Mn^{2+}$, $Mn^{3+}$, $Mn^{4+}$, $Fe^{2+}$, $Fe^{3+}$, $Co^{2+}$, $Co^{3+}$, $Zn^{2+}$, $Ga^{3+}$, $Ge^{4+}$, $As^{4+}$, $Pd^{2+}$, $Ag^{+}$, $In^{2+}$, $In^{3+}$, $Sn^{2+}$, and $W^{6+}$, and is not limited thereto.

Advantageous Effects

An anode active material of the present disclosure in which a phosphorus-based alloy coating layer is provided on a surface of a carbon-silicon composite having a cavity may relieve stress caused by volume expansion generated upon alloying of lithium and Si, when used in a lithium secondary battery.

Also, a method of manufacturing the anode active material of the present disclosure may ease the thickness control of the phosphorous-based alloy coating layer formed on the surface of the carbon-silicon composite through controlling a plating temperature and a plating time, and may enable recovery of a plating solution.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure. However, the present disclosure is not construed as being limited to the drawings.

BEST MODE FOR EMBODIMENT OF THE INVENTION

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 1:
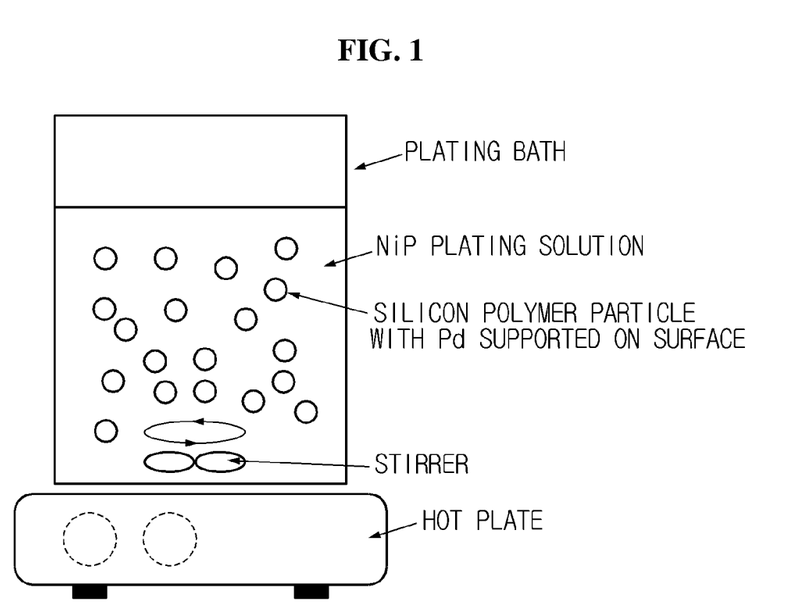
FIG. 1 is a diagram illustrating an apparatus for manufacturing an anode active material for a lithium secondary battery according to an exemplary embodiment.
Figure 2:
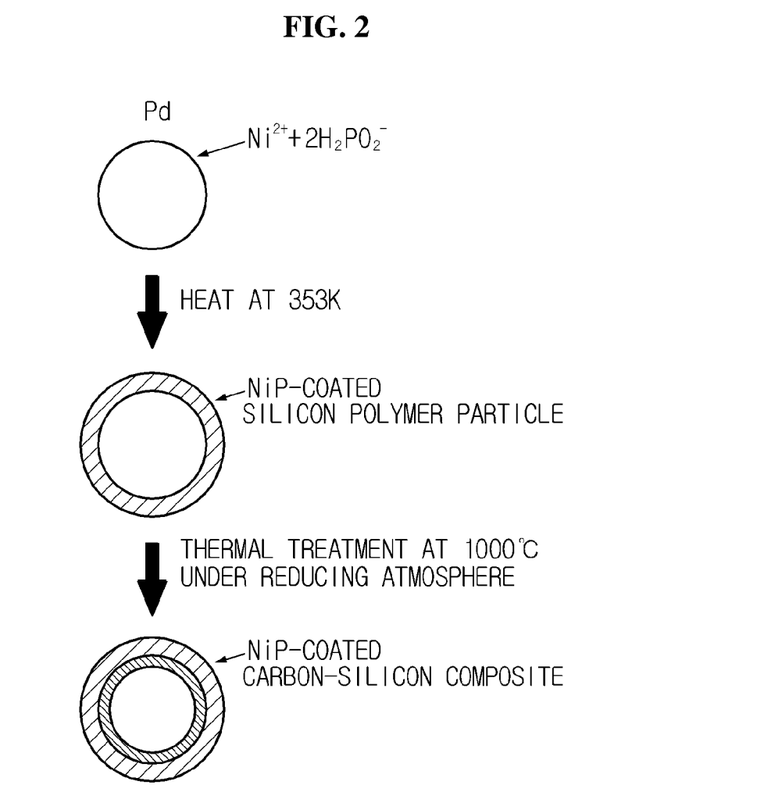
FIG. 2 is a diagram illustrating a process of manufacturing an anode active material for a lithium secondary battery according to an exemplary embodiment.

FIG. 1 illustrates an embodiment of an apparatus for manufacturing an anode active material for a lithium secondary battery according to the present disclosure. Also, FIG. 2 illustrates an embodiment of a process of manufacturing an anode active material for a lithium secondary battery according to the present disclosure. However, the description proposed herein is just a preferable example for the purpose of illustrations only, not intended to limit the scope of the disclosure, so it should be understood that other equivalents and modifications could be made thereto without departing from the spirit and scope of the disclosure.

An anode active material for a lithium secondary battery according to the present disclosure comprises a core including a carbon-silicon composite and having a cavity formed therein, and a coating layer formed on a surface of the core and including a phosphorus (P)-based alloy (See FIG. 2).

The anode active material functions to absorb lithium ions in a cathode active material during charging and then generates electric energy along the concentration gradient of lithium ions during the deintercalation of the absorbed lithium ions. If the anode active material is Si having high charging/discharging capacity, Si forms an alloy with lithium ions during the absorption of lithium ions to cause volume expansion. To solve the volume expansion problem of Si, the present disclosure introduced a coating layer including a phosphorus-based alloy on a surface of a carbon-silicon composite having a cavity formed therein.

The carbon-silicon composite is prepared by carbonizing a silicon polymer particle in a reducing atmosphere, and includes not only a carbon-silicon bond but also a carbon-silicon oxide bond containing oxygen. The use of the carbon-silicon composite contributes to alleviation of volume expansion of Si.

Also, such a carbon-silicon composite has a cavity inside, and due to this cavity, an effect of increasing a surface area of the carbon-silicon composite is produced, and when the volume of Si expands, the cavity may act as a buffer.

The core including the carbon-silicon composite of the present disclosure and having the cavity formed therein has the coating layer including the phosphorus (P)-based alloy on the surface thereof. The phosphorus (P)-based alloy is an alloy containing phosphorus, and includes alloys of phosphorus and metals such as Al, Ti, Cr, Mn, Fe, Co, Ni, Cu, Zn, Ga, Ge, As, Pd, Ag, In, Sn, and W. The phosphorus-based alloy is coated on the surface of the carbon-silicon composite to reduce degradation of the active material caused by the volume expansion.

The coating layer of the present disclosure is formed of a plurality of domains including the phosphorus-based alloy. Here, a domain has a boundary, and each domain represents a set of particles divisible by at least one domain boundary. The domains are formed on the surface of the surface of the carbon-silicon composite core and make up the coating layer, and the domains formed on the core have a shape similar to a semi-sphere. The domains are uniformly formed on the surface of the core. Also, an average diameter of the domains or a thickness of the coating layer including the domains is preferably equal to or less than 0.1 µm, and because the thickness greater than 0.1 µm hinders diffusion of the lithium ion through the domains, the excessively thick coating layer is not preferred.

Particularly, a density of the phosphorus-based alloy of the present disclosure is preferably in a range of 1.2 to 5.8 g cm$^{-3}$.

A specific surface area of the core of the carbon-silicon composite is preferably equal to or less than 10 m$^2$/g. When the specific surface area of the core is greater than 10 m$^2$/g, initial efficiency of the anode may reduce. In the present disclosure, a lower bound of the specific surface area of the core is not specially limited. A preferred lower bound may be 5 m$^2$/g, however this is just an example and is not limited thereto.

Also, the core may have a particle diameter in a range of 0.5 µm to 100 µm, preferably, 0.5 µm to 40 µm. When the average particle diameter of the core is less than 0.5 µm, initial efficiency of the anode may reduce due to fine powder of the core, and when the average particle diameter is greater than 100 µm, procedural efficiency of the anode slurry coating may reduce and scratches on an electrode may increase.

The anode active material of the present disclosure may be manufactured by the following method.

First, silicon polymer particles with the metal catalyst supported on the surface are prepared by treating silicon polymer particles with a metal chloride solution.

The silicon polymer represents a polymer containing at least one hetero atom such as silicon (Si) within a polymer repeat unit. The silicon polymer used in the present disclosure is not limited to a specific type, but may use particles of silicone resin, for example, polysiloxane, polysilane, and polycarbosilane. More preferably, an emulsion type in which silicon polymer particles in latex form are uniformly dispersed in a dispersion medium may be used.

Also, the metal chloride solution may be one that metal chloride selected from PdC12, SnC12, and CuC12 is dissolved in an aqueous solution of nitrohydrochloric acid or hydrochloric acid, or in a polar organic solvent of dimethylformamide (DMF), hexamethylphosphoramide (HMPA), dimethylacetamide (DMA) or dimethylsulfoxide(DMSO).

The silicon polymer particles are treated with the metal chloride solution, so that a metal from metal chloride is supported on the surface of the silicon polymer particles. The metal may act as a catalyst in a subsequent reaction process.

Subsequently, the silicon polymer particles with the catalyst supported on the surface are dispersed in a plating bath filled with a plating solution containing a metal ion for a phosphorus-based alloy and phosphoric acid.

Referring to FIG. 1, the plating bath has a stirrer at the bottom thereof to uniformly disperse, in the plating solution, the silicon polymer particles with the catalyst supported on the surface. As the plating solution, various types of plating solutions may be used, and a detailed description is as follows. In the case of an acidic electroless nickel plating solution, a mixture of a phosphorus-based alloy metal ion and sodium hypophosphite ($NaH_2PO_2 \cdot H_2O$) in an aqueous solution of lactic acid, propionic acid ($CH_3CH_2COOH$), sodium acetate ($CH_3CO_2Na$), sodium succinate ($CH_3CH_2COOH$), malic acid or sodium citrate may be used, and in the case of an alkaline electroless nickel plating solution, a mixture of a phosphorus-based alloy metal ion and sodium hypophosphite ($NaH_2PO_2 \cdot H_2O$) in an aqueous solution of ammonium chloride ($NH_4Cl$) or sodium pyrophosphate may be used.

As the metal ion used in the phosphorus-based alloy metal ion, $Ni^{2+}$, $Cu^{2+}$, $Ti^{4+}$, $Al^{3+}$, $Cr^{2+}$, $Cr^{3+}$, $Cr^{6+}$, $Mn^{2+}$, $Mn^{3+}$, $Mn^{4+}$, $Fe^{2+}$, $Fe^{3+}$, $Co^{2+}$, $Co^{3+}$, $Zn^{2+}$, $Ga^{3+}$, $Ge^{4+}$, $As^{4+}$, $Pd^{2+}$, $Ag^+$, $In^{2+}$, $In^{3+}$, $Sn^{2+}$, and $W^{6+}$ may be used, singularly or in combination.

Subsequently, the bath is heated to form phosphorus (P)-based alloy surface-coated silicon polymer particles.

The plating bath of FIG. 1 may use a hot plate to perform heating. Heating is performed while stirring the plating solution favorably by operating the stirrer. In this instance, a preferred temperature is in a range of 40 to 100° C. Through heating, phosphoric acid reacts with the phosphorus-based alloy ion, in the presence of the catalyst, on the surface of the silicon polymer particles to form phosphorus-based alloy surface-coated silicon polymer particles. Preferably, the phosphorus-based alloy may be coated while forming domains.

Finally, the phosphorus (P)-based alloy surface-coated silicon polymer particles are carbonized by heat treatment in a reducing atmosphere.

The reducing atmosphere is not particularly limited, but a reducing atmosphere such as $H_2$ or $N_2$ may be used. By carbonizing the phosphorus-based alloy surface-coated silicon polymer particles through heat treatment in a range of about 800 to 1200° C., oxygen or hydrogen inside is discharged outwards to form a cavity. In such a way, the anode active material of the present disclosure in which the phosphorus-based alloy coating layer is provided on the surface of the carbon-silicon composite having the cavity may be manufactured.

In FIG. 2, a process of forming the phosphorus-based alloy on the surface of the silicon polymer particles with the metal catalyst supported on the surface and a process of forming the anode active material having the cavity formed therein by heat treatment are illustrated. The phosphorus-based alloy may be easily formed due to the metal catalyst supported on the surface of the silicon polymer particles, and the internal cavity may be formed by high heat treatment in the reducing atmosphere.

The anode active material of the present disclosure manufactured as described in the foregoing may be used to manufacture an anode by a manufacturing method generally used in the art. Also, a cathode according to the present disclosure may be manufactured by a method generally used in the art. For example, the electrode may be manufactured by mixing an electrode active material of the present disclosure with a binder, a solvent, if necessary, a conductive material and a dispersant, agitating the mixture to prepare a slurry, applying the slurry to a current collector, and compressing the result.

As the binder, various types of binder polymers may be used, for example, polyvinylidene fluoride-co-hexafluoro propylene (PVDF-co-HFP), polyvinylidene fluoride, polyacrylonitrile, polymethylmethacrylate, and the like.

As the cathode active material, lithium-containing transition metal oxide may be preferably used, for example, any one selected from the group consisting of $Li_xCoO_2$ (0.5<x<1.3), $Li_xNiO_2$(0.5<x<1.3), $Li_xMnO_2$(0.5<x<1.3), $Li_xMn_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$(0.5<x<1.3, 0<y<1), $Li_xCo_{1-y}Mn_yO_2$(0.5<x<1.3, 0≤y<1), $Li_xNi_{1-y}Mn_yO_2$(0.5<x<1.3, 0≤y<1), $Li_x(Ni_aCo_bMn_c)O_4$(0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$(0.5<x<1.3, 0<z<2), $Li_xCoPO_4$(0.5<x<1.3) and $Li_xFePO_4$(0.5<x<1.3) or mixtures thereof, and the lithium-containing transition metal oxide may be coated with a metal such as aluminum (Al) or metal oxide. Also, besides the lithium-containing transition metal oxide, sulfide, selenide, and halide may be used.

When the electrode is manufactured, a lithium secondary battery generally used in the art, in which a separator interposed between the cathode and the anode and an electrolyte solution are included, may be manufactured using the electrode.

In the electrolyte solution used in the present disclosure, a lithium salt included as an electrolyte may use, without limitation, those generally used in an electrolyte solution for a lithium secondary battery, and for example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the electrolyte solution used in the present disclosure, an organic solvent included in the electrolyte solution may include, without limitation, those generally used in an electrolyte solution for a lithium secondary battery, as a representative example, any one selected from the group consisting of propylene carbonate (PC), ethylene carbonate (EC), diethyl carbonate (DEC), dimethyl carbonate (DMC), ethylmethylcarbonate (EMC), methylpropyl carbonate, dipropyl carbonate, dimethylsulfoxide, acetonitrile, dimethoxyethane, diethoxyethane, vinylene carbonate, sulfolane, gamma butyrolactone, propylene sulfate and tetrahydrofuran, or mixtures thereof. Particularly, among the carbonate-based organic solvents, cyclic carbonate such as ethylene carbonate and propylene carbonate corresponds to an organic solvent having a high viscosity, and is preferred to use because it dissociates a lithium salt in an electrolyte favorably due to its high dielectric constant, and in this instance, such cyclic carbonate is more preferred to use because it contributes to form an electrolyte solution having high electrical conductivity when mixed with linear carbonate having a low viscosity and a low dielectric constant such as dimethyl carbonate and diethyl carbonate at a proper ratio.

Optionally, the electrolyte solution stored according to the present disclosure may further include an additive, such as an overcharge inhibitor, used in a general electrolyte solution.

Also, as the separator, a general porous polymer film employed as a separator in the art may be used, for example, a porous polymer film made from a polyolefin-based polymer such as an ethylene homopolymer, a propylene homopolymer, an ethylene/butene copolymer, an ethylene/hexene copolymer, and an ethylene/methacrylate copolymer, arranged singularly or in a stack, or a general porous non-woven fabric, for example, a non-woven fabric made from a glass fiber having a high melting point, a polyethyleneterephthalate fiber, and the like, however the present disclosure is not limited thereto.

A battery casing used in the present disclosure may employ those generally used in the art, and is not limited to a specific outer shape based on usage of the battery, and the battery casing may have, for example, a cylindrical shape using a can, a prismatic shape, a pouch shape, a coin shape, and the like.

MODE FOR EMBODIMENT OF THE INVENTION

Hereinafter, a detailed description is provided through an embodiment example and a comparative example to describe embodiments and effects of the present disclosure more specifically. However, it should be understood that embodiments of the present disclosure may be modified in various forms and the scope of the invention is not limited to the following embodiment. The embodiments of the present disclosure are provided to describe the present disclosure to those skilled in the art more completely.

Embodiment Example

Figure 3:
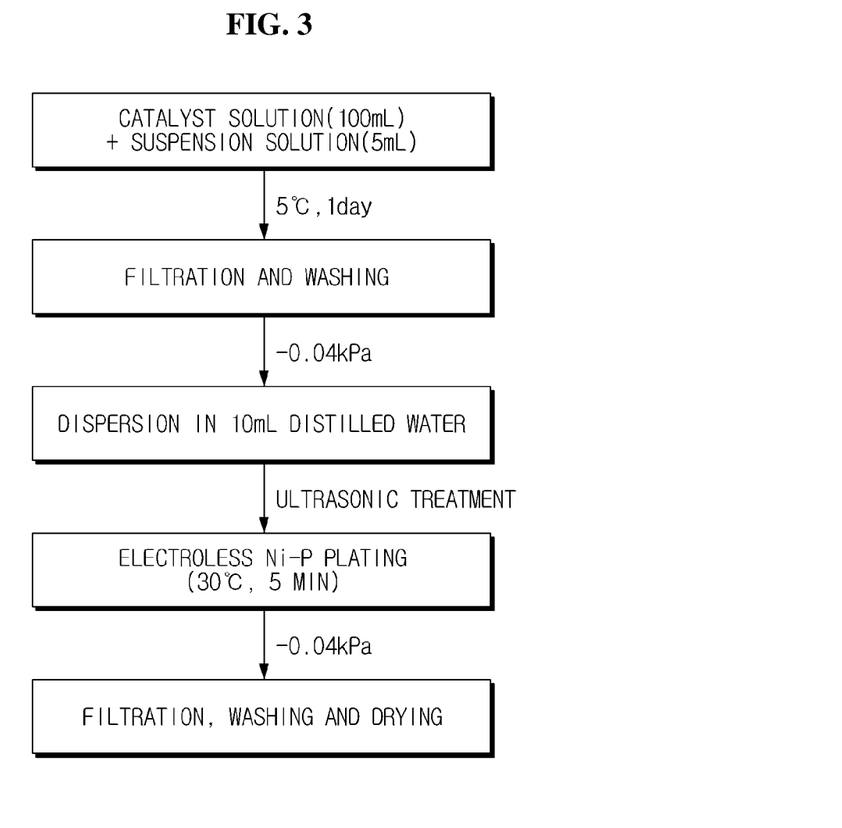
FIG. 3 is a flowchart schematically illustrating a procedure of Embodiment example 1.

Embodiment Example 1: Manufacture of an Anode Active Material with an Electroless Plating Layer and a Battery Comprising the same An electroless plating layer on silicon polymer was manufactured in accordance with the flowchart of FIG. 3.

5 ml of a suspension solution containing 40-50 wt % of solids including silicon-based polymer latex was put in 100 ml of an aqueous catalyst solution containing 0.1 g of $PdCl_2$ and 50 μl of nitrohydrochloric acid, followed by impregnation at about 5° C. for 24 hours, so that the Pd catalyst was adsorbed on the surface of the silicon polymer particles, and suction filtration and washing was conducted on the catalyst-adsorbed solution to collect powder in cake form. The collected powder was put in an electroless NiP plating solution including 15 g/L of $Ni(PH_2O_2)_2 \cdot 6H_2O$, 12.0 g/L of $H_3BO_3$, 2.5 g/L of $CH_3COONa$, and 1.3 g/L of $(NH_3)_2SO_4$, and after reaction at 30° C. for about 5 minutes, a precipitation reaction of Ni was stopped by lowering the temperature with ice water. Subsequently, the resulting NiP-plated silicon polymer was collected through suction filtration, and freeze-dried to completely remove water.

Powder obtained through freeze-drying was heat-treated at temperature of 1000° C. in an inert atmosphere of $N_2$ or Ar or a reducing atmosphere in which $H_2$ is present in part. In this instance, through reduction and carbonization of the silicon polymer, a silicon-carbon composite was formed.

Figure 4:
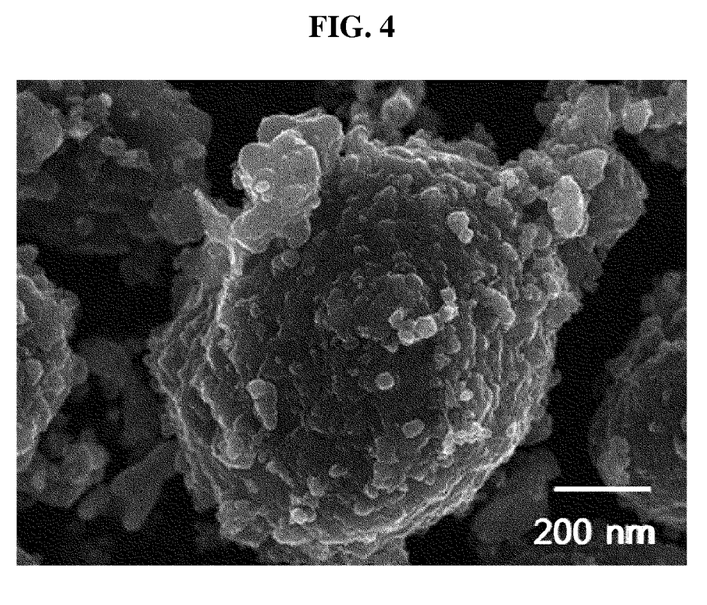
FIG. 4 is a photographic image of an active material obtained in Embodiment example 1.

In FIG. 4, a photographic image of an active material obtained through electroless plating and heat treatment of a silicon polymer particulate is shown. As seen in FIG. 4, a spheric particle having a diameter of about 0.6 μm was obtained.

An NMP(N-methyl pyrrolidone)-based organic slurry was prepared based on a composition including the active material, VGCF as a conductive material, and a polyimide-based binder as a binder at 95:1:4, and was applied to a Cu current collector, followed by drying and pressing processes, to manufacture an electrode. A coin cell was manufactured using the manufactured electrode, a metal lithium as an opposite electrode, and an EC+EMC organic solvent containing 1M $LiPF_6$ as an electrolyte.

Comparative Example 1: Manufacture of an Anode Active Material Without an Electroless Plating Layer and a Battery Comprising the same An anode active material and a coin cell were manufactured by the same method as Embodiment example 1 except an electroless plating layer was not formed on silicon polymer.

Figure 5:
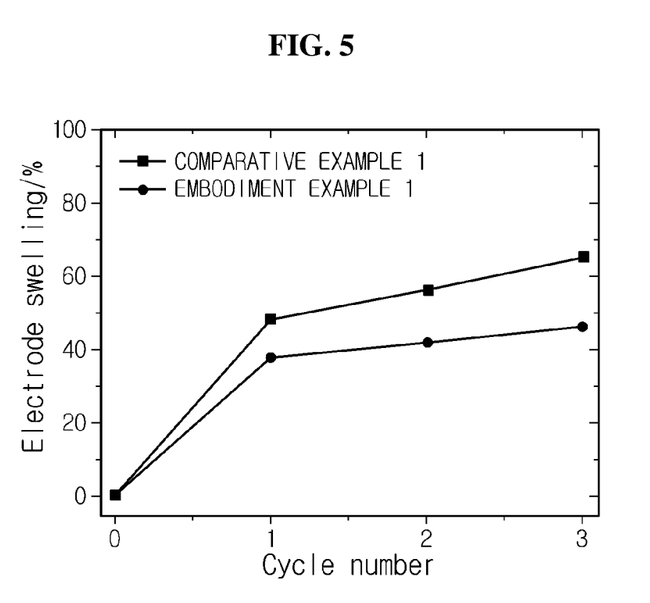
FIG. 5 illustrates a volume expansion result of electrodes manufactured in Embodiment example 1 and Comparative example 1 during charge/discharge cycles.

Evaluation Experiment:

In FIG. 5, an average of volume expansion of an electrode during three (3) charge/discharge cycles is shown. To show the extent of volume expansion of the electrode, a thickness of the electrode at charge on each cycle was measured relative to an initial thickness of the electrode. The electrode of Embodiment example 1 using the active material with NiP electroless plating and heat treatment exhibited less volume expansion on each cycle than the electrode of Comparative example 1 using the active material without electroless plate coating, and thus, was found to be effective in suppressing the volume expansion.

Figure 6:
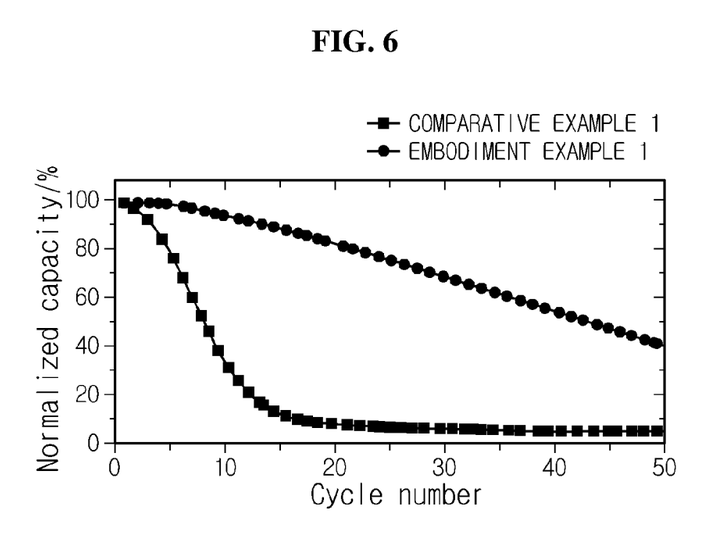
FIG. 6 illustrates a cycle characteristics result of electrodes manufactured in Embodiment example 1 and Comparative example 1.

In FIG. 6, the cycle characteristics result of the electrodes manufactured in Embodiment example 1 and Comparative example 1 are shown. It was found that the electrode of Comparative example 1 without plating exhibited the deterioration in cycle characteristics during 10 cycles, while the NiP-plated electrode of Embodiment example 1 suppressed an extent of cycle characteristic deterioration.

What is claimed is:

1. A method of manufacturing an anode active material for the lithium secondary battery, the method comprising, treating a silicon polymer particle with a metal chloride solution to prepare the silicon polymer particle with a metal catalyst supported on a surface;

dispersing the silicon polymer particle with the metal catalyst supported on the surface in a plating bath filled with a plating solution containing a metal ion for a phosphorous-based alloy and phosphoric acid;

heating the bath to form a phosphorous (P)-based alloy surface-coated silicon polymer particle; and carbonizing the phosphorous (P)-based alloy surface-coated silicon polymer particle by heat treatment in a range of 800 to 1200° C. in a reducing atmosphere, thereby forming a core including a carbon-silicon composite and having a cavity formed inside.

2. The method of manufacturing the anode active material for the lithium secondary battery according to claim 1, wherein the silicon polymer particle is polysiloxane, polysilane, and polycarbosilane.

3. The method of manufacturing the anode active material for the lithium secondary battery according to claim 1, wherein the metal chloride solution is one that metal chloride selected from $PdCl_2$, $SnCl_2$, and $CuCl_2$ is dissolved in an aqueous solution of nitrohydrochloric acid or hydrochloric acid, or in a polar organic solvent of dimethylformamide (DMF), hexamethylphosphoramide (HMPA), dimethylacetamide (DMA) or dimethylsulfoxide (DMSO).

4. The method of manufacturing the anode active material for the lithium secondary battery according to claim 1, wherein the metal ion for the phosphorous-based alloy is one type of ion selected from $Ni^{2+}$, $Cu^{2+}$, $Ti^{4+}$, $Al^{3+}$, $Cr^{2+}$, $Cr^{3+}$, $Cr^{6+}$, $Mn^{2+}$, $Mn^{3+}$, $Mn^{4+}$, $Fe^{2+}$, $Fe^{3+}$, $Co^{2+}$, $Co^{3+}$, $Zn^{2+}$, $Ga^{3+}$, $Ge^{4+}$, $As^{4+}$, $Pd.^{2+}$, $Ag^+$, $In^{2+}$, $In^{3+}$, $Sn^{2+}$, and $W^{6+}$, or mixtures thereof.

\* \* \* \* \*